US012521849B2

(12) United States Patent
Hsu et al.

(10) Patent No.: US 12,521,849 B2
(45) Date of Patent: Jan. 13, 2026

(54) ELECTRIC RATCHET WRENCH

(71) Applicant: TECHWAY INDUSTRIAL CO., LTD., Taichung (TW)

(72) Inventors: Chih-Hua Hsu, Taichung (TW); Chen-Chen Cheng, Taichung (TW); Kuo-Chou Li, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 337 days.

(21) Appl. No.: 18/305,546

(22) Filed: Apr. 24, 2023

(65) Prior Publication Data

US 2024/0351171 A1 Oct. 24, 2024

(51) Int. Cl.
*B25B 21/00* (2006.01)
*B25B 13/46* (2006.01)
*B25F 5/00* (2006.01)

(52) U.S. Cl.
CPC .......... *B25B 21/004* (2013.01); *B25B 13/462* (2013.01); *B25F 5/001* (2013.01)

(58) Field of Classification Search
CPC ....... B25B 21/00; B25B 21/004; B25B 13/46; B25B 13/462; B25B 19/00; B25F 5/001
USPC ...... 81/57, 57.11, 57.12, 57.13, 57.14, 57.26
See application file for complete search history.

(56) References Cited

U.S. PATENT DOCUMENTS

| | | | | | |
|---|---|---|---|---|---|
| 5,993,454 | A * | 11/1999 | Longo | B23Q 5/048 606/85 |
| 6,039,126 | A * | 3/2000 | Hsieh | B66F 3/12 173/217 |
| 6,675,911 | B2 * | 1/2004 | Driessen | B25F 3/00 173/171 |
| 6,915,721 | B2 * | 7/2005 | Hsu | B25B 21/004 81/57.13 |
| 7,604,528 | B2 * | 10/2009 | Lo | B25F 5/008 451/354 |
| D626,395 | S * | 11/2010 | Lau | D8/71 |
| D626,398 | S * | 11/2010 | Lau | D8/107 |
| 2007/0251711 | A1 * | 11/2007 | Chen | B25B 21/00 173/213 |
| 2008/0190246 | A1 * | 8/2008 | Hsu | B25B 23/147 81/57.13 |
| 2010/0224033 | A1 * | 9/2010 | Yeoh | B25B 21/02 173/217 |
| 2012/0186400 | A1 * | 7/2012 | Elger | B25B 13/465 81/54 |

(Continued)

*Primary Examiner* — Edward F Landrum
(74) *Attorney, Agent, or Firm* — Guice Patents PLLC

(57) ABSTRACT

An electric ratchet wrench includes a wrench main casing, a motor, a ratchet head casing and a motor fixing member. The wrench main casing has two main casing locking parts, the two main casing locking parts are symmetrically arranged at one end of the wrench main casing, the motor is accommodated in the wrench main casing, the ratchet head casing comprises a plug-connected part, and the plug-connected part is inserted into the aforementioned end of the wrench main casing. The motor fixing member is accommodated in the wrench main casing and located between the plug-connected part and the motor, the motor fixing member is used to fix the motor, and the motor fixing member is clamped and positionally limited between one end edge of the plug-connected part and the main casing locking parts.

10 Claims, 4 Drawing Sheets

(56) References Cited

U.S. PATENT DOCUMENTS

| | | | | |
|---|---|---|---|---|
| 2014/0157961 | A1* | 6/2014 | Chen | B25B 21/02<br>81/464 |
| 2021/0122025 | A1* | 4/2021 | Cyborski | B25F 5/001 |
| 2021/0331300 | A1* | 10/2021 | Schulz | B25B 23/0007 |
| 2022/0388131 | A1* | 12/2022 | Chung | B25B 21/004 |

* cited by examiner

ELECTRIC RATCHET WRENCH

FIELD OF THE INVENTION

The invention relates to a hand tool structure, and more particularly to an electric ratchet wrench.

DESCRIPTION OF THE RELATED ART

Due to the advancement of technology, electric hand tools are developing by leaps and bounds to improve the convenience of construction. The conventional electric ratchet wrench comprises a ratchet head casing and a wrench main casing. The ratchet head casing is locked to a connecting nut by its external screw thread, and then screwed and locked to the main wrench casing through the connecting nut. The structure is complex and the cost is higher.

In view of the above mentioned, how to improve the structure of the electric ratchet wrench in order to reduce structural complexity and improve ease of assembly has become a goal the manufacturers endeavor to reach.

SUMMARY OF THE INVENTION

In order to solve the above problems, the invention provides an electric ratchet wrench capable of reducing structural complexity and improving ease of assembly through its structural configuration.

An electric ratchet wrench provided by the invention comprises a wrench main casing, a motor, a ratchet head casing and a motor fixing member. The wrench main casing comprises two main casing locking parts, the two main casing locking parts are symmetrically arranged at one end of the wrench main casing, the motor is accommodated in the wrench main casing, the ratchet head casing comprises a plug-connected part, and the plug-connected part is inserted into the aforementioned end of the wrench main casing. The motor fixing member is accommodated in the wrench main casing and located between the plug-connected part and the motor, the motor fixing member is used to fix the motor, and the motor fixing member is clamped and positionally limited between one end edge of the plug-connected part and the main casing locking parts.

Thereby, through the structural configuration in which the ratchet head casing is inserted into the wrench main casing and the motor fixing member is clamped and positionally limited, beneficial efficacies of reducing structural complexity and improving ease of assembly can be achieved.

Preferably, the wrench main casing further comprises a first inlaying portion, the first inlaying portion is located at the aforementioned end, the ratchet head casing comprises a second inlaying portion, the second inlaying portion is located on the plug-connected part and inlays with the first inlaying portion correspondingly.

Preferably, the wrench main casing further comprises two alignment slots, the two alignment slots are symmetrically arranged at the aforementioned end of the wrench main casing, the ratchet head casing further comprises two alignment protrusions, each of the alignment protrusions is located on the plug-connected part and used to match with each of the alignment slots.

Preferably, the wrench main casing further comprises a first shell portion and a second shell portion, the first shell portion is assembled with the second shell portion to form a tubular accommodating space for accommodating the motor, the first inlaying portion comprises four inlaying protrusions protruding radially inward, two of the inlaying protrusions are located at the first shell portion, the other two inlaying protrusions are located at the second shell portion, one of the alignment slots is located at the first shell portion and located between two of the inlaying protrusions, the other alignment slot is located at the second shell portion and located between the other two inlaying protrusions, the second inlaying portion comprises two grooves, the two alignment protrusions are respectively located between the two grooves, and an extending direction of each of the alignment protrusions is parallel to an axial direction of the motor.

Preferably, the motor fixing member comprises a plate portion, a lower ring portion and two clamped portions, the plate portion comprises an opening, the lower ring portion is connected to a lower surface of the plate portion and comprises a through hole, the through hole communicates with the opening to form an axis space, the two clamped portions radially extend from the lower ring portion and are connected to the lower surface of the plate portion, each of the clamped portions comprises a concave arc, and a shape of each of the concave arcs corresponds to each of the main casing locking parts.

Preferably, the motor fixing member further comprises two motor screw locking parts extending radially from the lower ring portion and connecting to the lower surface of the plate portion, 90 degrees are provided between each of the motor screw locking parts and each of the clamped portions, and each of the motor screw locking parts is screwed and fixed with the motor.

Preferably, the electric ratchet wrench further comprises a transmission mechanism, the transmission mechanism is located in the ratchet head casing and comprises a ring gear and a connecting shaft, the ring gear is abutted against by the plate portion, the connecting shaft is located in the ring gear and protrudes into the axis space and is connected to a motor shaft of the motor, wherein the motor fixing member further comprises a positioning ring protrusion, the positioning ring protrusion protrudes from an upper surface of the plate portion for positioning the ring gear.

Preferably, the motor fixing member further comprises two positioning protrusions, each of the positioning protrusions extends radially inward from an inner wall of the positioning ring protrusion, the ring gear comprises two positioning recesses located at a lower end of the ring gear, and each of the positioning recesses is provided for embedding each of the positioning protrusions.

Preferably, the ratchet head casing and the ring gear abut against each other.

Preferably, the ratchet head casing further comprises two abutting protrusions, the ring gear further comprises two abutting recesses located at an upper end of the ring gear, and each of the abutting recesses matches with each of the abutting protrusions.

Preferably, the electric ratchet wrench further comprises a ratchet mechanism located in the ratchet head casing and driven by the transmission mechanism.

DETAILED DESCRIPTION OF THE INVENTION

Figure 1:
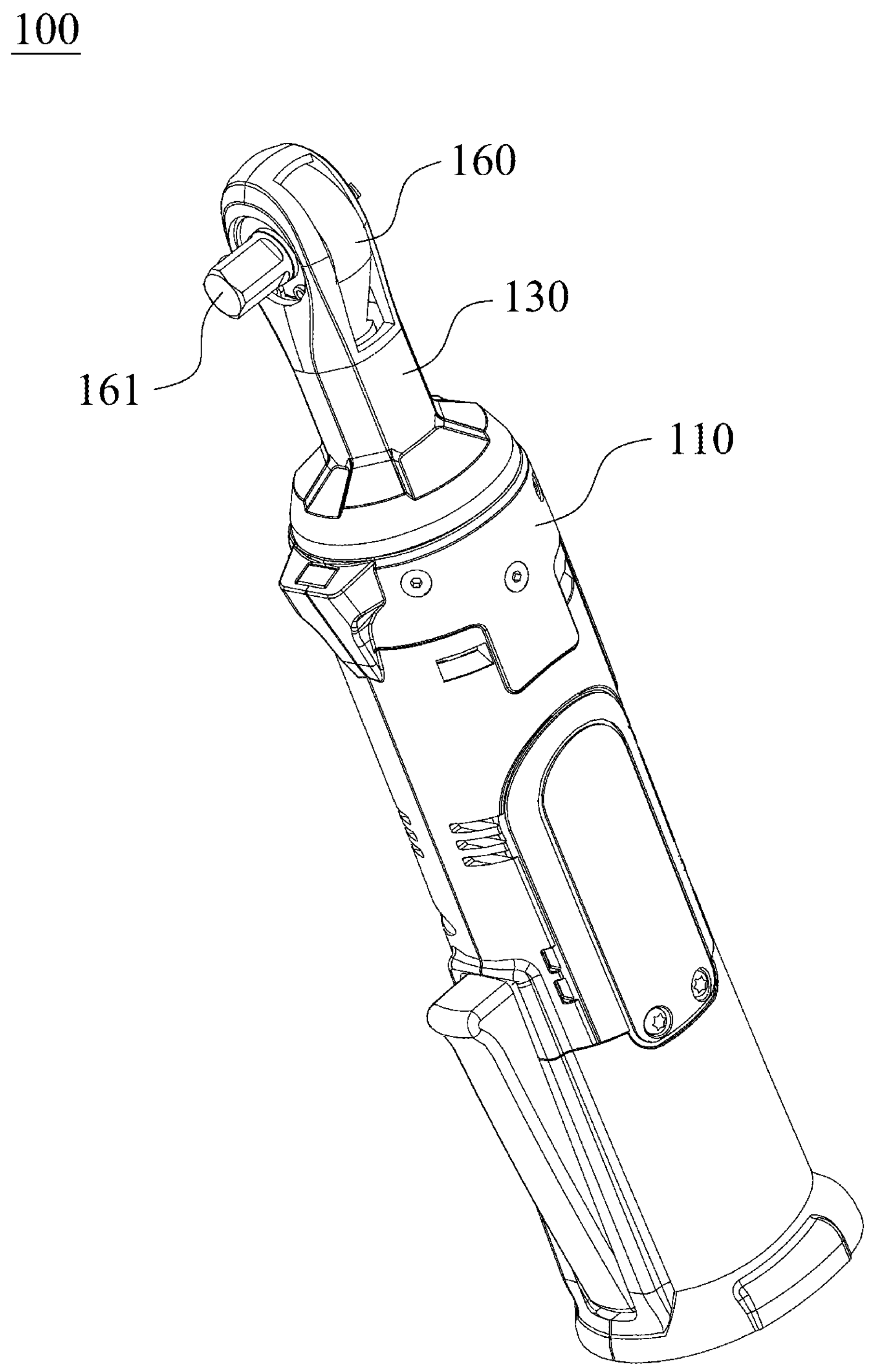
FIG. 1 is a perspective view of an electric ratchet wrench according to a preferred embodiment of the invention.

Embodiments of the invention will be described below with reference to the drawings. For the sake of clarity, many practical details are described in the following narrative. However, readers should understand that these practical details should not be used to limit the invention. That is, in some embodiments of the invention, these practical details are non-essential. In addition, for the sake of simplifying the drawings, some conventional and commonly used structures and elements will be depicted in a simple and schematic manner in the drawings; and repeated elements can be indicated by the same or similar numerals.

In addition, terms such as first, second, and third in this specification are merely used to describe different elements or components, and there is no limitation on the elements/components themselves. Therefore, the first element/component can also be renamed as the second element/component. And the combination of elements/components/mechanisms/modules in this specification is not a combination that is generally known or conventional in this technical field, whether the elements/components/mechanisms/modules themselves are conventional can not be used to determine whether the combination relationship can be easily achieved by persons having ordinary skill in the art to which the invention pertains.

Figure 2:
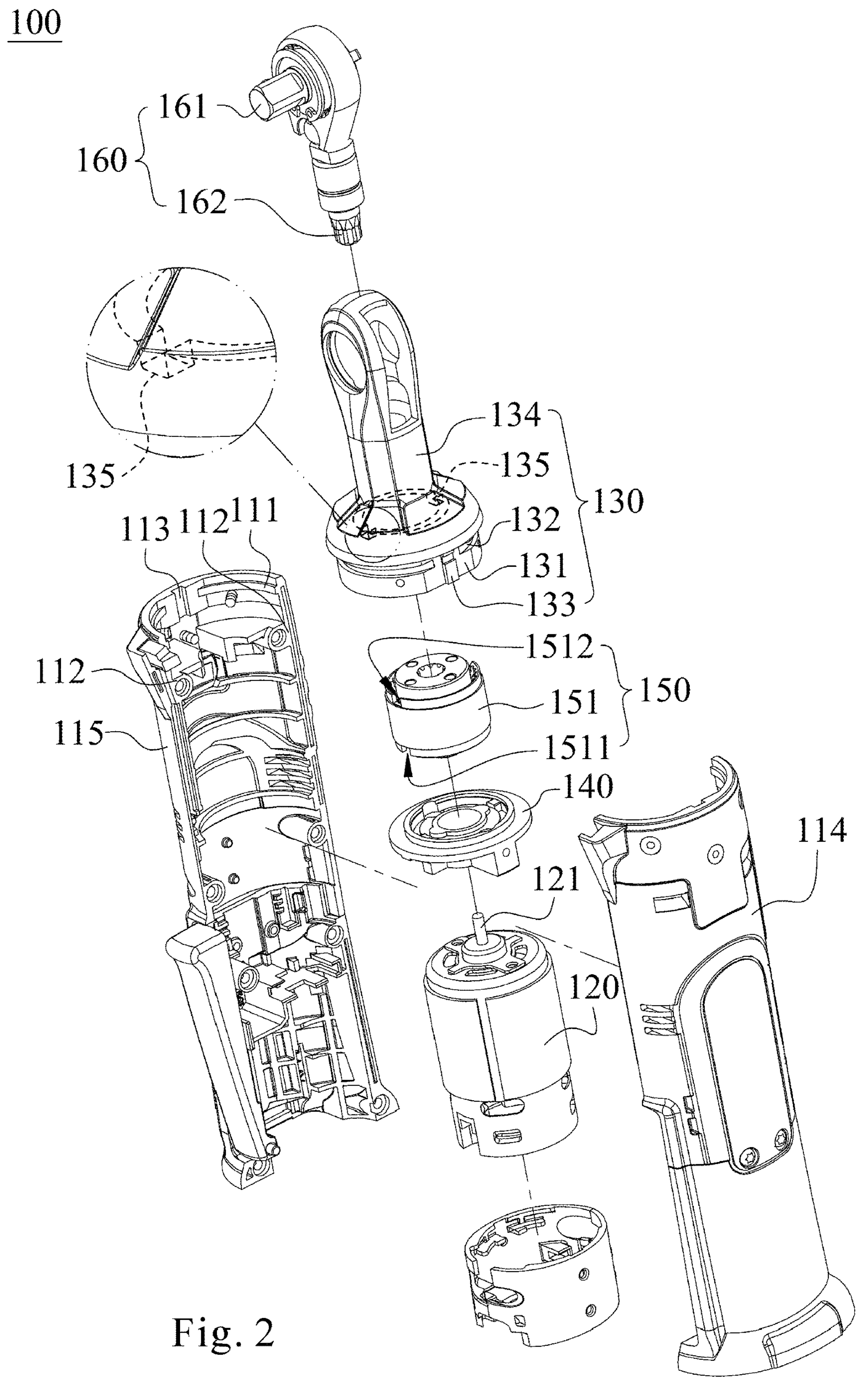
FIG. 2 is an exploded perspective view of the electric ratchet wrench of the embodiment in FIG. 1.

Please refer to FIGS. 1 and 2, in which FIG. 1 shows a perspective view of an electric ratchet wrench 100 according to an embodiment of the invention, and FIG. 2 shows an exploded perspective view of the electric ratchet wrench 100 according to the embodiment of FIG. 1. The electric ratchet wrench 100 comprises a wrench main casing 110, a motor 120, a ratchet head casing 130 and a motor fixing member 140. The wrench main casing 110 comprises two main casing locking parts 112, the two main casing locking parts 112 are symmetrically arranged at one end of the wrench main casing 110, and the motor 120 is accommodated in the wrench main casing 110. The ratchet head casing 130 comprises a plug-connected part 131, and the plug-connected part 131 is inserted into the aforementioned end of the wrench main casing 110. The motor fixing member 140 is accommodated in the wrench main casing 110 and located between the plug-connected part 131 and the motor 120. The motor fixing member 140 is used to fix the motor 120, and the motor fixing member 140 is clamped and positionally limited between one end edge of the plug-connected part 131 and the main casing locking parts 112.

Thereby, through the structural configuration in which the ratchet head casing 130 is inserted into the wrench main casing 110 and the motor fixing member 140 is clamped and positionally limited, beneficial efficacies of reducing structural complexity and improving ease of assembly of the electric ratchet wrench 100 can be achieved. Details of the electric ratchet wrench 100 will be described hereinafter.

The wrench main casing 110 comprises a first shell portion 114 and a second shell portion 115. After the first shell portion 114 and the second shell portion 115 are assembled with each other, a tubular accommodating space can be formed for accommodating components such as the motor 120. Each of the main casing locking parts 112 can be divided into two portions and located at the first shell portion 114 and the second shell portion 115 respectively. Screws can be combined with the two portions of the main casing locking parts 112 to securely lock and connect the first shell portion 114 with the second shell portion 115.

The wrench main casing 110 can further comprise a first inlaying portion 111, the first inlaying portion 111 is located at the aforementioned end. The ratchet head casing 130 can comprise a second inlaying portion 132, and the second inlaying portion 132 is located on the plug-connected part 131 and inlays with the first inlaying portion 111 correspondingly. Specifically, the first inlaying portion 111 is located above the main casing locking parts 112, and the first inlaying portion 111 can comprise four inlaying protrusions protruding radially inward, two of the inlaying protrusions are located at the first shell portion 114, and the other two inlaying protrusions are located at the second shell portion 115.

The electric ratchet wrench 100 can further comprise a ratchet mechanism 160 located in the ratchet head casing 130. In detail, the ratchet head casing 130 can comprise a ratchet accommodating portion 134 and the plug-connected part 131, the ratchet accommodating portion 134 extends from the plug-connected part 131 along an axial direction of the motor 120 toward a direction away from the wrench main casing 110, and the ratchet accommodating portion 134 is provided for disposing the ratchet mechanism 160 of the electric ratchet wrench 100, and exposing a driving end 161 of the ratchet mechanism 160 for performing operation. The second inlaying portion 132 comprises two grooves, one of the grooves can correspond to two of the inlaying protrusions. Therefore, when the plug-connected part 131 of the ratchet head casing 130 is located at the aforementioned end of the wrench main casing 110, each of the grooves is capable of accommodating each of the inlaying protrusions to limit a position of the ratchet head casing 130 relative to the wrench main casing 110. It should be particularly noted that the ratchet mechanism 160 is conventional and not a focus of improvement of the invention, and therefore the ratchet mechanism 160 will not be described in detail herein.

Moreover, the wrench main casing 110 can further comprise two alignment slots 113, the two alignment slots 113 are symmetrically arranged at the aforementioned end of the wrench main casing 110, and the ratchet head casing 130 further comprises two alignment protrusions 133, each of the alignment protrusions 133 is located on the plug-connected part 131 and used to match with each of the alignment slots 113. One of the alignment slots 113 can be located at the first shell portion 114 and between two of the inlaying protrusions, the other alignment slot 113 can be located at the second shell portion 115 and between the other two inlaying protrusions, and the two alignment protrusions 133 are respectively located between the two grooves. An extending direction of each of the alignment protrusions 133 is parallel to an axial direction of the motor 120, so that the ratchet head casing 130 can be limited positionally both in axial direction and in radial direction, thereby improving a stability of structural connection. Further, the plug-connected part 131 of the ratchet head casing 130 can comprise radially arranged screw holes to be screwed and locked with the wrench main casing 110, but the invention is not limited thereto.

Figure 3:
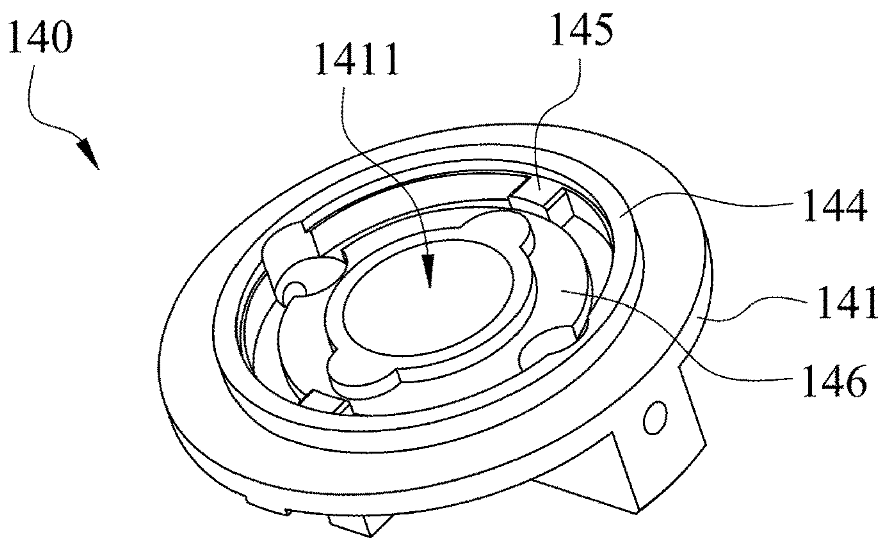
FIG. 3 is a perspective view of a motor fixing member of the electric ratchet wrench of the embodiment in FIG. 1.
Figure 4:
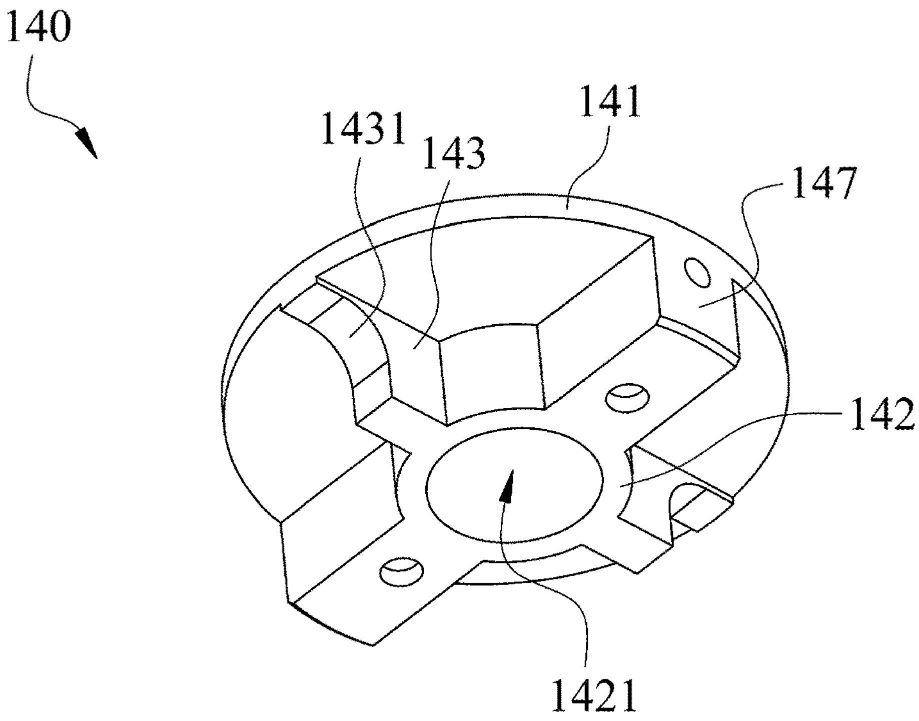
FIG. 4 is another perspective view of the motor fixing member of the electric ratchet wrench of the embodiment in FIG. 1.
Figure 5:
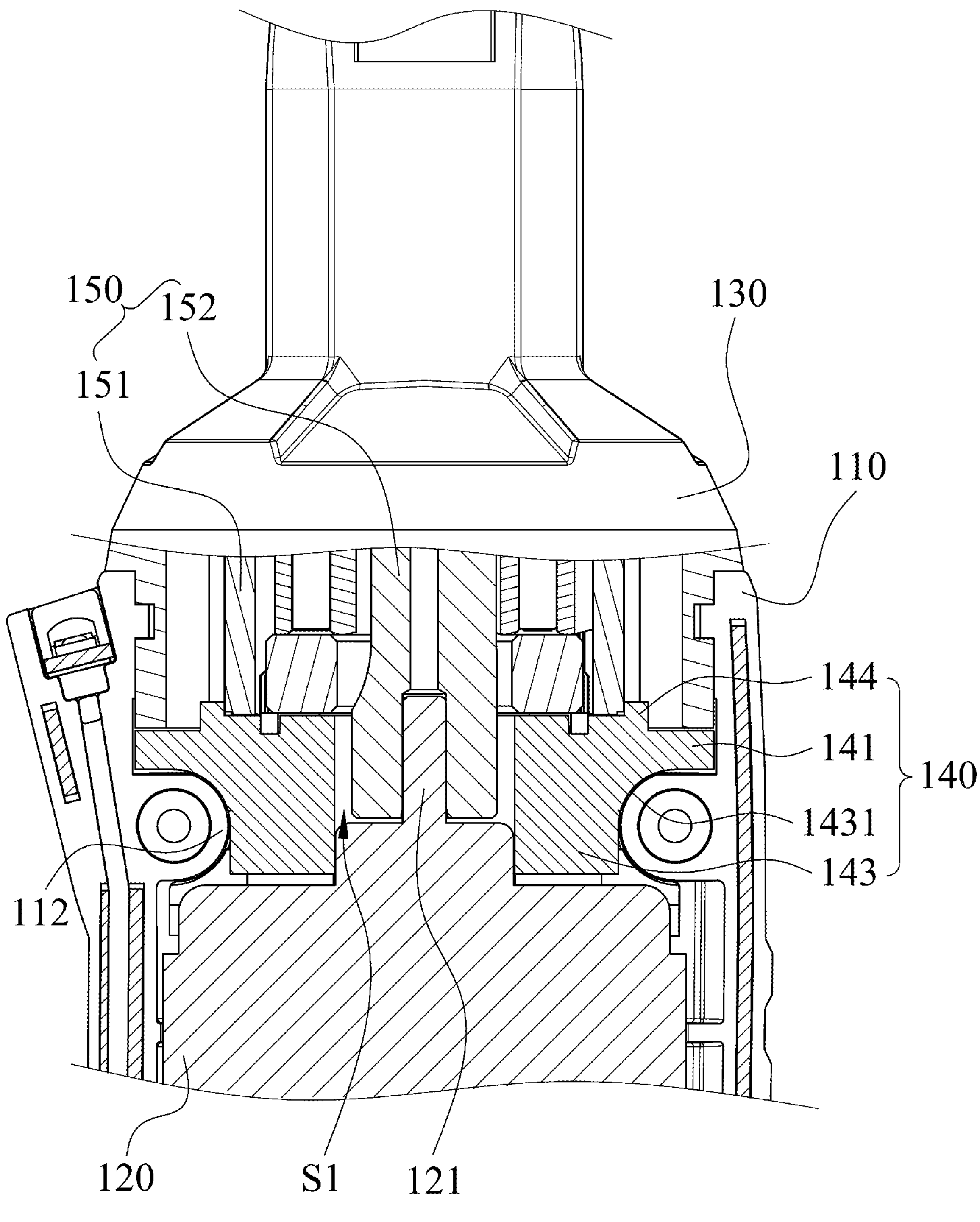
FIG. 5 is a cross-sectional view of the electric ratchet wrench of the embodiment in FIG. 1.

Please refer to FIGS. 3 to 5, and also FIGS. 1 to 2, in which FIG. 3 shows a perspective view of the motor fixing member 140 of the electric ratchet wrench 100 of the embodiment in FIG. 1, FIG. 4 shows another perspective view of the motor fixing member 140 of the electric ratchet wrench 100 of the embodiment in FIG. 1, and FIG. 5 shows a cross-sectional view of the electric ratchet wrench 100 of the embodiment in FIG. 1. The motor fixing member 140 can comprise a plate portion 141, a lower ring portion 142 and two clamped portions 143. The plate portion 141 comprises an opening 1411, the lower ring portion 142 is connected to a lower surface of the plate portion 141 and comprises a through hole 1421, and the through hole 1421 communicates with the opening 1411 to form an axis space S1. The two clamped portions 143 radially extend from the lower ring portion 142 and are connected to the lower surface of the plate portion 141. Each of the clamped portions 143 comprises a concave arc 1431, and a shape of each of the concave arcs 1431 corresponds to each of the main casing locking parts 112. The motor fixing member 140 can further comprise two motor screw locking parts 147 extending radially from the lower ring portion 142 and connecting to the lower surface of the plate portion 141, 90 degrees are provided between each of the motor screw locking parts 147 and each of the clamped portions 143, and each of the motor screw locking parts 147 is screwed and fixed with the motor 120.

In detail, the plate portion 141 has a disc structure, and the lower ring portion 142 has a ring structure. The two motor screw locking parts 147 and the two clamped portions 143 are arranged in a cross shape around the lower ring portion 142, and each of the clamped portions 143 has a notch forming the concave arc 1431. Each of the motor screw locking parts 147 comprises a screw hole axially penetrating to reach the plate portion 141, and the motor 120 can also comprise a corresponding screw hole, so that a screw can be locked into the motor 120 by passing through each of the motor screw locking parts 147 from the plate portion 141 in order to fix the motor 120 on the motor fixing member 140. Further, the motor screw locking parts 147 can comprise radially arranged screw holes to be screwed and locked with the wrench main casing 110, but the invention is not limited thereto.

As shown in FIGS. 2 to 5, the electric ratchet wrench 100 can further comprise a transmission mechanism 150. The transmission mechanism 150 is located in the ratchet head casing 130 and comprises a ring gear 151 and a connecting shaft 152. The ring gear 151 abuts against the plate portion 141. The connecting shaft 152 is located in the ring gear 151 and protrudes into the axis space S1 and is connected to a motor shaft 121 of the motor 120. The ratchet mechanism 160 can be driven by the transmission mechanism 150. The motor fixing member 140 further comprises a positioning ring protrusion 144, the positioning ring protrusion 144 protrudes from an upper surface of the plate portion 141 for positioning the ring gear 151. In addition, the motor fixing member 140 can further comprise two positioning protrusions 145, each of the positioning protrusions 145 extends radially inward from an inner wall of the positioning ring protrusion 144, the ring gear 151 comprises two positioning recesses 1511 located at a lower end of the ring gear 151, and each of the positioning recesses 1511 is provided for embedding each of the positioning protrusions 145.

Specifically, the transmission mechanism 150 is located in the plug-connected part 131 and connected to a transmission shaft 162 of the ratchet mechanism 160. The transmission mechanism 150 can further comprise a planetary gear. Through the connecting shaft 152, the planetary gear and the ring gear 151, power of the motor 120 can be transmitted to the ratchet mechanism 160.

The positioning ring protrusion 144 extends upward from the plate portion 141, and the motor fixing member 140 can further comprise a boss 146 located on the plate portion 141, so that a ring groove is formed between the boss 146 and the positioning ring protrusion 144, and the positioning protrusions 145 are located in the ring groove. The ring gear 151 has an annular structure, when the ring gear 151 is positioned in the ring groove, the positioning recesses 1511 can be positioned with the positioning protrusions 145 correspondingly, which is conducive to improving structural stability.

In addition to the ring gear 151 abutting and positioning with the motor fixing member 140, the ratchet head casing 130 and the ring gear 151 are also capable of abutting against each other. Wherein the ratchet head casing 130 can further comprise two abutting protrusions 135, the two abutting protrusions 135 are located in the ratchet head casing 130, the ring gear 151 further comprises two abutting recesses 1512 located at an upper end of the ring gear 151, and each of the abutting recesses 1512 matches with each of the abutting protrusions 135, thereby the ring gear 151 is capable of abutting against the motor fixing member 140 and the ratchet head casing 130.

Therefore, when assembling, the motor 120, the motor fixing member 140 and the connecting shaft 152 of the transmission mechanism 150 are assembled with one another first, and the ratchet head casing 130 is assembled with the ratchet mechanism 160, and then the transmission mechanism 150, the motor 120, the motor fixing member 140, the ratchet head casing 130 and the ratchet mechanism 160 are abutted and positioned with one another as a whole to be put into the wrench main casing 110. At this time, through cooperation between the first inlaying portion 111 and the second inlaying portion 132, and the motor fixing member 140 being clamped by the plug-connected part 131 and the main casing locking parts 112, all the components can be temporarily positioned, thereby simply locking the second shell portion 115 with the first shell portion 114, and screws are locked at required positions, completion of assembly can be achieved.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. An electric ratchet wrench comprising:

a wrench main casing comprising:

two main casing locking parts symmetrically arranged at an end of the wrench main casing;

a motor accommodated in the wrench main casing;

a ratchet head casing comprising a plug-connected part, the plug-connected part being inserted into the end of the wrench main casing; and a motor fixing member accommodated in the wrench main casing and located between the plug-connected part and the motor, the motor fixing member being used to fix the motor, and the motor fixing member being clamped and positionally limited between one end edge of the plug-connected part and the main casing locking parts; wherein the motor fixing member comprises:

a plate portion comprising an opening;

a lower ring portion connected to a lower surface of the plate portion and comprising a through hole, the through hole communicates with the opening to form an axis space; and two clamped portions radially extending from the lower ring portion and connecting to the lower surface of the plate portion, each of the clamped portions comprises a concave arc, and a shape of each of the concave arcs corresponds to each of the main casing locking parts.

2. The electric ratchet wrench as claimed in claim 1, wherein the wrench main casing further comprises a first inlaying portion, the first inlaying portion is located at the end, the ratchet head casing comprises a second inlaying portion, the second inlaying portion is located on the plug-connected part and inlays with the first inlaying portion correspondingly.

3. The electric ratchet wrench as claimed in claim 2, wherein the wrench main casing further comprises two alignment slots, the two alignment slots are symmetrically arranged at the end of the wrench main casing, the ratchet head casing further comprises two alignment protrusions, each of the alignment protrusions is located on the plug-connected part and used to match with each of the alignment slots.

4. The electric ratchet wrench as claimed in claim 3, wherein the wrench main casing further comprises a first shell portion and a second shell portion, the first shell portion is assembled with the second shell portion to form a tubular accommodating space for accommodating the motor, the first inlaying portion comprises four inlaying protrusions protruding radially inward, two of the inlaying protrusions are located at the first shell portion, the other two inlaying protrusions are located at the second shell portion, one of the alignment slots is located at the first shell portion and located between two of the inlaying protrusions, the other alignment slot is located at the second shell portion and located between the other two inlaying protrusions, the second inlaying portion comprises two grooves, the two alignment protrusions are respectively located between the two grooves, and an extending direction of each of the alignment protrusions is parallel to an axial direction of the motor.

5. The electric ratchet wrench as claimed in claim 1, wherein the motor fixing member further comprises:

two motor screw locking parts extending radially from the lower ring portion and connecting to the lower surface of the plate portion, 90 degrees are provided between each of the motor screw locking parts and each of the clamped portions, and each of the motor screw locking parts is screwed and fixed with the motor.

6. The electric ratchet wrench as claimed in claim 5, further comprising a transmission mechanism, the transmission mechanism being located in the ratchet head casing and comprising:

a ring gear abutted against by the plate portion; and a connecting shaft located in the ring gear and protruding into the axis space and connecting to a motor shaft of the motor;

wherein the motor fixing member further comprises a positioning ring protrusion, the positioning ring protrusion protrudes from an upper surface of the plate portion for positioning the ring gear.

7. The electric ratchet wrench as claimed in claim 6, further comprising:

a ratchet mechanism located in the ratchet head casing and driven by the transmission mechanism.

8. The electric ratchet wrench as claimed in claim 6, wherein the motor fixing member further comprises two positioning protrusions, each of the positioning protrusions extends radially inward from an inner wall of the positioning ring protrusion, the ring gear comprises two positioning recesses located at a lower end of the ring gear, and each of the positioning recesses is provided for embedding each of the positioning protrusions.

9. The electric ratchet wrench as claimed in claim 8, wherein the ratchet head casing and the ring gear abut against each other.

10. The electric ratchet wrench as claimed in claim 9, wherein the ratchet head casing further comprises two abutting protrusions, the ring gear further comprises two abutting recesses located at an upper end of the ring gear, and each of the abutting recesses matches with each of the abutting protrusions.

* * * * *